United States Patent
Nakhjavani

(10) Patent No.: US 10,974,852 B2
(45) Date of Patent: Apr. 13, 2021

(54) AIRCRAFT LANDING GEAR MONITORING SYSTEMS AND METHODS

(71) Applicant: THE BOEING COMPANY, Chicago, IL (US)

(72) Inventor: Omid B. Nakhjavani, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 158 days.

(21) Appl. No.: 16/279,518

(22) Filed: Feb. 19, 2019

(65) Prior Publication Data

US 2020/0262588 A1    Aug. 20, 2020

(51) Int. Cl.
| B64F 5/60 | (2017.01) |
| B64C 25/12 | (2006.01) |
| B64C 25/14 | (2006.01) |

(52) U.S. Cl.
CPC ............... B64F 5/60 (2017.01); B64C 25/12 (2013.01); B64C 25/14 (2013.01); *B64C 2025/125* (2013.01)

(58) Field of Classification Search
CPC . B64F 5/60; B64C 25/12; B64C 25/14; B64C 2025/125
See application file for complete search history.

(56) References Cited

U.S. PATENT DOCUMENTS

| 2015/0298654 | A1* | 10/2015 | Joao | G01S 19/13 701/2 |
| 2017/0287239 | A1* | 10/2017 | Levy | G06F 11/321 |
| 2018/0222599 | A1 | 8/2018 | Papadopoulos | |
| 2018/0364707 | A1* | 12/2018 | Bosworth | A61B 5/0205 |
| 2019/0318741 | A1* | 10/2019 | Songa | G10L 15/26 |
| 2020/0258039 | A1* | 8/2020 | Burch | B64F 1/222 |
| 2020/0262588 | A1* | 8/2020 | Nakhjavani | B64F 5/60 |

FOREIGN PATENT DOCUMENTS

| EP | 3498602 | 6/2016 |

OTHER PUBLICATIONS

Extended European Search Report for EP 20158230.1-1009, dated Jun. 29, 2020.

* cited by examiner

*Primary Examiner* — Peter D Nolan
*Assistant Examiner* — Wae L Louie
(74) *Attorney, Agent, or Firm* — The Small Patent Law Group LLC; Joseph M. Butscher

(57) ABSTRACT

Landing gear monitoring systems and methods for an aircraft include a landing gear timing analysis control unit that is configured to analyze one or both of landing gear motion of one or more landing gears of the aircraft or door motion of one or more doors proximate to the landing gear(s) to determine an operational status of one or both of the landing gear(s) or the door(s).

20 Claims, 4 Drawing Sheets

AIRCRAFT LANDING GEAR MONITORING SYSTEMS AND METHODS

FIELD OF THE DISCLOSURE

Embodiments of the present disclosure generally relate to aircraft landing gear monitoring systems and methods.

BACKGROUND OF THE DISCLOSURE

Various types of aircraft are used to transport passengers and cargo between various locations. Each aircraft typically flies between different locations according to a defined flight plan or path. For example, an aircraft departs from a departure location and flies to an arrival location.

A typical aircraft includes at least one landing gear that is configured to be moved between a deployed position, such as when the aircraft is on the ground, taking off, or about to land, and a retracted position, such as when the aircraft is in flight. For example, the aircraft includes three landing gears, namely a nose landing gear, a left main landing gear, and a right main landing gear.

Over time and with repeated use, each landing gear may need attention from a ground crew, such as for maintenance, servicing, or replacement. Normal wear and tear may require certain portions of the landing gear to be replaced, updated, fixed, or the like. As such, a ground crew typically inspects each landing gear on a regular basis, such as after each flight of the aircraft.

However, a visual inspection of landing gear may not always accurately assess whether a landing gear is in need of attention. Further, conducting maintenance on airplane systems and subsystems after a landing gear is no longer effective disrupts airplane operations, causes loss of revenue, and often requires rescheduling of one or more flights.

SUMMARY OF THE DISCLOSURE

A need exists for a system and a method for monitoring landing gear of an aircraft. Further, a need exists for a system and a method for accurately determining when landing gear of an aircraft is in need of servicing and maintenance. Additionally, a need exists for a system and a method for assessing current and future effectiveness of landing gear of an aircraft.

With those needs in mind, certain embodiments of the present disclosure provide a landing gear monitoring system for an aircraft. The landing gear monitoring system includes a landing gear timing analysis control unit that is configured to analyze one or both of landing gear motion of one or more landing gears of the aircraft or door motion of one or more doors proximate to the one or more landing gears to determine an operational status of one or both of the landing gear(s) or the door(s).

In at least one embodiment, the door(s) are configured to cover the landing gear(s) when the landing gear(s) are in a retracted position. The door(s) are configured to open to allow the landing gear(s) to move into a deployed position. The landing gears may include a nose landing gear, a left main landing gear, and a right main landing gear.

In at least one embodiment, one or more sensors are in communication with the landing gear timing analysis control unit. The sensor(s) are configured to detect one or both of the landing gear motion or the door motion.

In at least one embodiment, a timer is in communication with the landing gear timing analysis control unit. The landing gear timing analysis control unit is configured to detect, via the timer, one or both of a landing gear motion time of the landing gear motion between a retracted position and a deployed position or a door motion time of the door motion between a closed position and an open position.

In at least one embodiment, the landing gear timing analysis control unit is configured to analyze the landing gear motion between a retracted position and a deployed position in relation to at least one normal landing gear operating time for the landing gear(s) to determine the operational status of the landing gear(s). In at least one example, a timing database is in communication with the landing gear timing analysis control unit. The normal landing gear operating time(s) may be stored in the timing database. As an example, the at least one normal landing gear operating time includes one or both of a normal landing gear deployment operating time and a normal landing gear retraction operating time.

In at least one embodiment, the landing gear timing analysis control unit is configured to analyze the door motion between a closed position and an open position in relation to at least one normal door operating time for the door(s) to determine the operational status of the door(s). In at least one embodiment, a timing database is in communication with the landing gear timing analysis control unit. The normal door operating time(s) may be stored in the timing database. As an example, the at least one normal door operating time includes one or both of a normal door opening operating time and a normal door closing operating time.

In at least one embodiment, the landing gear timing analysis control unit is configured to analyze one or both of the landing gear motion or the door motion and predict a time of effectiveness of one or both of the landing gear(s) or the door(s).

Certain embodiments of the present disclosure provide a landing gear monitoring method for an aircraft. The landing gear monitoring method includes analyzing (by a landing gear timing analysis control unit) one or both of landing gear motion of one or more landing gears of the aircraft or door motion of one or more doors proximate to the landing gear(s), and determining through the analyzing (by the landing gear timing analysis control unit) an operational status of one or both of the landing gear(s) or the door(s).

In at least one embodiment, the landing gear monitoring method also includes communicatively coupling one or more sensors with the landing gear timing analysis control unit, and detecting, by the sensor(s), one or both of the landing gear motion or the door motion.

In at least one embodiment, the landing gear monitoring method also includes communicatively coupling a timer with the landing gear timing analysis control unit, and detecting (by the landing gear timing analysis control unit via the timer) one or both of a landing gear motion time of the landing gear motion between a retracted position and a deployed position or a door motion time of the door motion between a closed position and an open position.

In at least one embodiment, the analyzing includes analyzing the landing gear motion between a retracted position and a deployed position in relation to at least one normal landing gear operating time for the one or more landing gears.

In at least one embodiment, the analyzing includes analyzing the door motion between a closed position and an open position in relation to at least one normal door operating time for the door(s).

In at least one embodiment, the landing gear monitoring method includes predicting a time of effectiveness of one or both of the landing gear(s) or the door(s).

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide landing gear monitoring systems and methods that are configured to determine and predict when landing gear is to be serviced and/or replaced. Embodiments of the present disclosure allow landing gear to be serviced, replaced, and/or the like before a potential failure of the landing gear.

In at least one embodiment, a method for monitoring and analyzing landing gear performance to provide predictive maintenance includes receiving landing gear output data from sensors on and/or proximate to landing gear, compiling a database of landing gear output data from multiple aircraft, applying a statistical method to determine acceptable times for operation (including landing gear door and mechanism operation), determining a threshold for normal landing gear operation, identifying operation outside of the normal threshold, and providing maintenance or repair recommendations for in response to a determination that the landing gear is operating outside of the normal threshold. Certain embodiments of the present disclosure combine aircraft landing gear lifecycle history with predictive maintenance analysis to identify potential abnormal conditions and provide maintenance recommendations before a potential failure.

Figure 1:
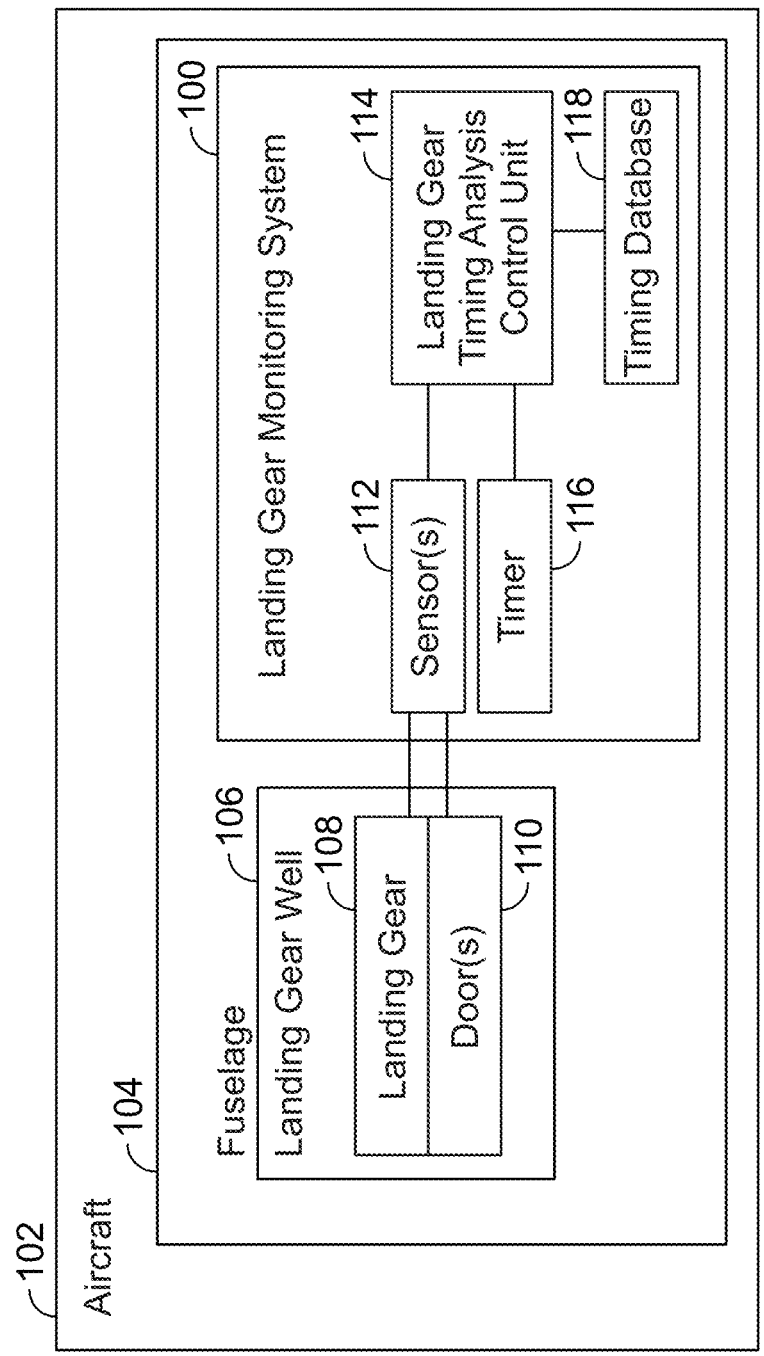
FIG. 1 illustrates a schematic box diagram of a landing gear monitoring system for an aircraft, according to an embodiment of the present disclosure.

FIG. 1 illustrates a schematic box diagram of a landing gear monitoring system 100 for an aircraft 102, according to an embodiment of the present disclosure. The aircraft 102 includes a fuselage 104 defining a landing gear well 106 (for example, a landing gear storage bay) in which landing gear 108 is positioned in a retracted position. In the retracted position, the landing gear 108 within the landing gear well 106 may be covered by one or more doors 110. The landing gear 108 is in the retracted position when the aircraft 102 is in flight, such as during a cruising phase. When the aircraft 102 transitions to a landing phase, for example, the door(s) 110 open, and the landing gear 108 is moved into a deployed position so that the aircraft 102 may land. The landing gear 108 is in the deployed position when the aircraft 102 is on the ground, during a takeoff phase, and during a landing phase, for example. The landing gear 108 is configured to be moved between the retracted position within the landing gear well 106, and the deployed position when the door(s) 110 are open and at least a portion of the landing gear 106 extends out of the landing gear well 106. The aircraft 102 may include multiple landing gears 108. For example, the aircraft 102 includes a nose landing gear, a left main landing gear, and a right main landing gear, each of which is configured to move into and out of its own landing gear well 106.

The landing gear monitoring system 100 includes one or more sensors 112 in relation to the landing gear 108 and/or the door(s) 110. For example, one or more sensors 112 may be on or proximate to the landing gear 108 and are configured to detect when the landing gear 108 is in the retracted position and the deployed position. Additionally, or optionally, one or more sensors 112 may be on or proximate to the door(s) 110 and are configured to detect when the door(s) 110 are closed and open. In at least one embodiment, the sensor(s) 112 may be position sensors, such as encoders, infrared sensors, ultrasonic sensors, video cameras, and/or the like.

The landing gear monitoring system 100 also includes a landing gear timing analysis control unit 114, which is in communication with the sensor(s) 112, a timer 116, and a timing database 118, such as through one or more wired or wireless connections. In at least one embodiment, the landing gear timing analysis control unit 114 may include the timer 116 and/or the timing database 118.

As shown, the landing gear monitoring system 100 may be on or within the aircraft 102. In at least one other embodiment, at least portions of the landing gear monitoring system 100 may be remotely located from the aircraft 102, such as at a central monitoring station. For example, the sensor(s) 112 may be onboard the aircraft 102, but the landing gear timing analysis control unit 114, the timer 116, and the timing database 118 may be at a central monitoring center, such as at an airport.

In operation, the sensor(s) 112 detect when the landing gear 108 is in a retracted position and a deployed position. Additionally, in at least one embodiment, the sensor(s) 112 detect when the door(s) 110 are in a closed position and an open position. The landing gear timing analysis control unit 114 is configured to analyze landing gear motion (from a retracted position to a deployed position, and vice versa) in relation to normal operating times for the landing gear 108 (such as a normal landing gear deployment operating time and a normal landing gear retraction operating time) to determine whether or not the landing gear 108 is properly operating. In at least one embodiment, the landing gear timing analysis control unit 114 is also configured to analyze door motion (from a closed position to an open position, or vice versa) in relation to normal operating times for the door 110 (such as a normal door opening operating time and a normal door closing operating time) to determine whether or not the door(s) 110 are properly operating.

As the landing gear 108 moves between the retracted position and the deployed position, the landing gear time control unit 114 receives sensor signals from the sensor(s) 112. The sensor signals include a retracted position sensor signal and a deployed position sensor signal. The landing gear timing analysis control unit 114 determines that the landing gear 108 is in the retracted position upon receiving the retracted position sensor signal. Similarly, the landing gear timing analysis control unit 114 determines that the landing gear 108 is in the deployed position upon receiving the deployed position sensor signal.

The sensor signals also include a closed door sensor signal and an open door sensor signal. The landing gear timing analysis control unit 114 determines that the door(s) 110 is closed upon receiving the closed door signal. Similarly, the landing gear timing analysis control unit 114 determines that the door(s) 110 is open upon receiving the open door signal.

The timer 116 detects the time of motion between the retracted position of the landing gear 108 and the deployed position of the landing gear 108, and vice versa. The timer 116 may be a digital clock, for example, that is configured to detect such times and output a timing signal to the landing gear timing analysis control unit 114.

The landing gear timing analysis control unit 114 receives sensor signals from the sensor(s) 112 from the landing gear 108 indicating that the landing gear 108 is moving from the retracted position to the deployed position, or vice versa. At the same time, the landing gear timing analysis control unit 114 receives the timing signal from the timer 116, and is therefore able to determine the time for the landing gear 108 to move from the retracted position to the deployed position, or vice versa. As such, the landing gear timing analysis control unit 114 determines the time for the landing gear 108 to move between the retracted position to the deployed position (whether from the retracted position to the deployed position or from the deployed position to the retracted position).

The landing gear timing analysis control unit 114 then compares the time of motion for the landing gear 108 with one or more normal landing gear operating times stored in the timing database 118. The normal landing gear operating times may be empirically determined through analysis of landing gear motion for numerous aircraft (for example, hundreds or thousands) over a particular time period. Based on such analysis, a normal landing gear operating time (such as a threshold or range) is established. In at least one other embodiment, the normal landing gear operating time may be defined by a manufacturer.

In at least one embodiment, the landing gear timing analysis control unit 114 compares the deployment time of motion of the landing gear 108 from the retracted position to the deployed position and compares the deployment time of motion to a normal landing gear deployment operating time stored in the timing database 118. If the deployment time of motion agrees with (for example, matches or is within an acceptable range) the normal landing gear deployment operating time, the landing gear timing analysis control unit 114 determines that the landing gear 108 is properly (that is, normally) deploying. If, however, the deployment time of motion does not agree with the normal landing gear deployment operating time (for example, too fast or too slow), the landing gear timing analysis control unit 114 determines that the landing gear 108 is improperly (that is, abnormally) deploying. As such, the landing gear timing analysis control unit 114 may output an alert, such as to a flight computer of the aircraft 102, a monitoring center, and/or the like that that landing gear 108 is in need of attention (for example, servicing, maintenance, or replacement).

In at least one embodiment, the landing gear timing analysis control unit 114 compares the retraction time of motion of the landing gear 108 from the deployed position to the retracted position and compares the retracted time of motion to a normal landing gear retraction operating time stored in the timing database 118. If the retraction time of motion agrees with (for example, matches or is within an acceptable range) the normal landing gear retraction operating time, the landing gear timing analysis control unit 114 determines that the landing gear 108 is properly (that is, normally) retracting. If, however, the retraction time of motion does not agree with the normal landing gear retraction operating time (for example, too fast or too slow), the landing gear timing analysis control unit 114 determines that the landing gear 108 is improperly (that is, abnormally) retracting. As such, the landing gear timing analysis control unit 114 may output an alert, such as to a flight computer of the aircraft 102, a monitoring center, and/or the like that that landing gear 108 is in need of attention (for example, servicing, maintenance, or replacement).

In at least one embodiment, the landing gear timing analysis control unit 114 stores the times of motion (for example, the deployment times of motion and the retraction times of motion) over a particular time period, such as one or more months or years. The landing gear timing analysis control unit 114 analyzes timing trends over the time period. Based on the timing trends (such as increased or decreased times), the landing gear timing analysis control unit 114 predicts future times of motion. For example, based on a decreasing or increasing slope of a particular timing motion (whether retraction or deployment), the landing gear timing analysis control unit 114 predicts a time of motion for one or more future flights. In this manner, the landing gear timing analysis control unit 114 is able to accurately predict when the landing gear 108 may no longer be effective. Accordingly, the landing gear timing analysis control unit 114 may output a predicted time of effectiveness to a pilot, maintenance crew, or the like so that the landing gear 108 (or one or more portions thereof) may be replaced before the landing gear 108 is ineffective.

In at least one embodiment, the landing gear timing analysis control unit 114 also receives sensor signals from the sensor(s) 112 from the door(s) 110 indicating that the door(s) 110 are moving from a closed position to an open position, or vice versa. At the same time, the landing gear timing analysis control unit 114 receives the timing signal from the timer 116, and is therefore able to determine the time for the door(s) 110 to move from the closed position to the open position, or vice versa. As such, the landing gear timing analysis control unit 114 determines the time for the door(s) 110 to move between the closed position to the open position (whether from the closed position to the open position or from the open position to the closed position).

The landing gear timing analysis control unit 114 then compares the time of motion for the door(s) 110 with one or more normal operating times stored in the timing database 118. The timing ranges may be empirically determined through analysis of door motion for numerous aircraft (for example, hundreds or thousands) over a particular time period. Based on such analysis, a normal operating time (such as a threshold or range) is established. In at least one other embodiment, the normal operating time may be defined by a manufacturer.

In at least one embodiment, the landing gear timing analysis control unit 114 compares the opening time of motion of the door(s) 110 from the closed position to the open position and compares the opening time of motion to a normal door opening operating time stored in the timing database 118. If the opening time of motion agrees with (for example, matches or is within an acceptable range) the normal door opening operating time, the landing gear timing analysis control unit 114 determines that the door(s) 110 is properly (that is, normally) opening. If, however, the opening time of motion does not agree with the normal door opening operating time (for example, too fast or too slow), the landing gear timing analysis control unit 114 determines that the door(s) 110 is improperly (that is, abnormally) opening. As such, the landing gear timing analysis control unit 114 may output an alert, such as to a flight computer of the aircraft 102, a monitoring center, and/or the like that that door(s) 110 is in need of attention (for example, servicing, maintenance, or replacement).

In at least one embodiment, the landing gear timing analysis control unit 114 compares the closing time of motion of the door(s) 110 from the open position to the closed position and compares the closing time of motion to a normal door closing operating time stored in the timing database 118. If the closing time of motion agrees with (for example, matches or is within an acceptable range) the normal door closing operating time, the landing gear timing analysis control unit 114 determines that the door(s) 110 is properly (that is, normally) closing. If, however, the closing time of motion does not agree with the normal door closing operating time (for example, too fast or too slow), the landing gear timing analysis control unit 114 determines that the door(s) 110 is improperly (that is, abnormally) closing. As such, the landing gear timing analysis control unit 114 may output an alert, such as to a flight computer of the aircraft 102, a monitoring center, and/or the like that that door(s) 110 is in need of attention (for example, servicing, maintenance, or replacement).

In at least one embodiment, the landing gear timing analysis control unit 114 stores the times of motion (for example, the opening times of motion and the closing times of motion) over a particular time period, such as one or more months or years. The landing gear timing analysis control unit 114 analyzes timing trends over the time period. Based on the timing trends (such as increased or decreased times), the landing gear timing analysis control unit 114 predicts future times of motion. For example, based on a decreasing or increasing slope of a particular timing motion (whether opening or closing), the landing gear timing analysis control unit 114 predicts a time of motion for one or more future flights. In this manner, the landing gear timing analysis control unit 114 is able to accurately predict when the door(s) 110 may no longer be effective. Accordingly, the landing gear timing analysis control unit 114 may output a predicted time of effectiveness to a pilot, maintenance crew, or the like so that the door(s) 110 (or one or more portions thereof) may be replaced before the door(s) 110 are ineffective.

As described herein, certain embodiments of the present disclosure provide the landing gear monitoring system 100 for the aircraft 102. The landing gear monitoring system 100 includes the landing gear timing analysis control unit 114 that is configured to analyze one or both of landing gear motion of one or more landing gears 108 of the aircraft 102 or door motion of one or more doors 110 proximate to the landing gear(s) 108 to determine an operational status of the landing gear(s) 108 and/or the doors 110. The operational status of the landing gear(s) 108 and/or the doors 110 includes whether one or both of the landing gear(s) 108 or the door(s) 110 is properly (or improperly) operating.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the landing gear timing analysis control unit 114 may be or include one or more processors that are configured to control operation thereof, as described herein.

The landing gear timing analysis control unit 114 is configured to execute a set of instructions that are stored in one or more data storage units or elements (such as one or more memories), in order to process data. For example, the landing gear timing analysis control unit 114 may include or be coupled to one or more memories. The data storage units may also store data or other information as desired or needed. The data storage units may be in the form of an information source or a physical memory element within a processing machine.

The set of instructions may include various commands that instruct the landing gear timing analysis control unit 114 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the landing gear timing analysis control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the landing gear timing analysis control unit 114 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
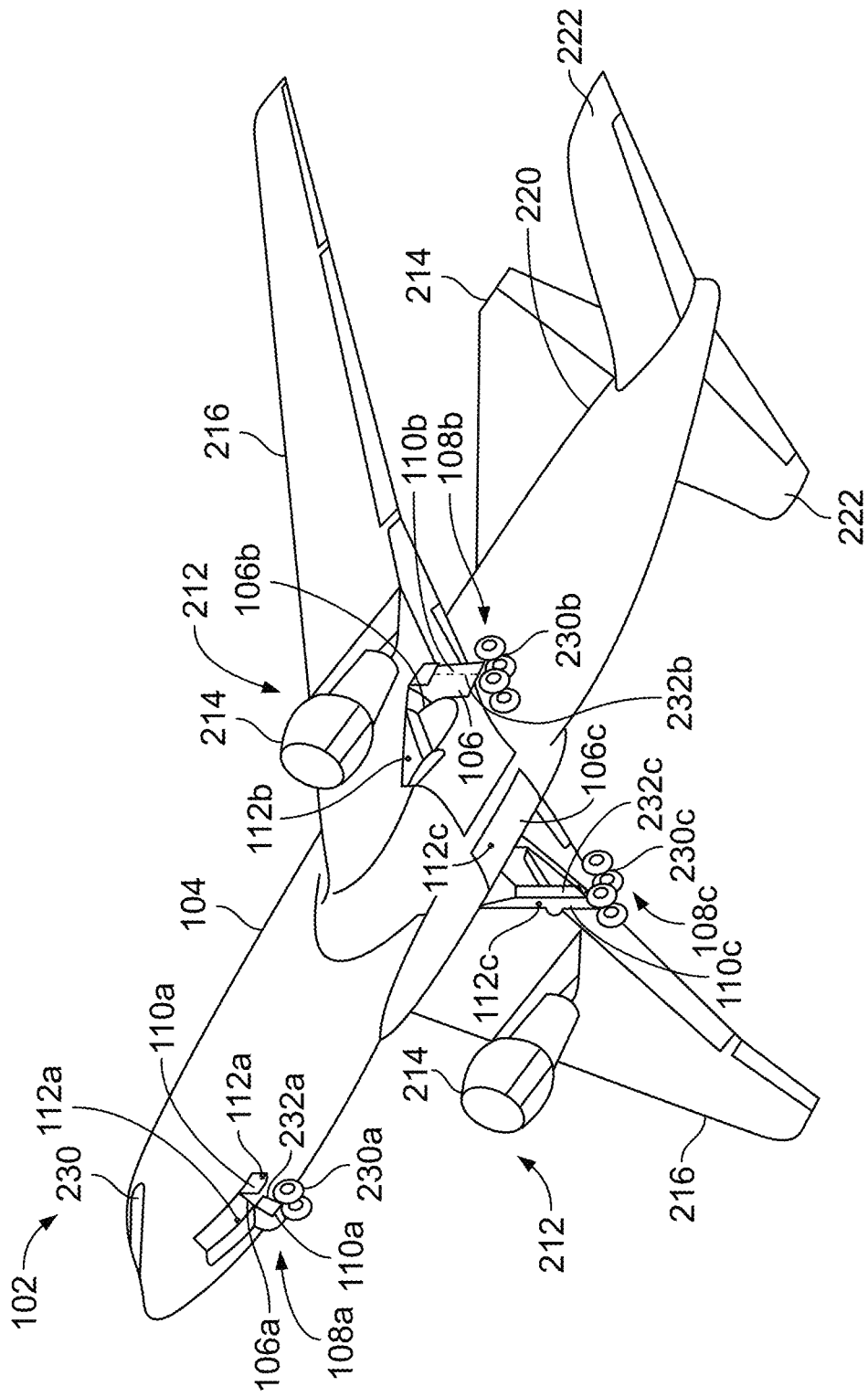
FIG. 2 is a diagrammatic representation of a bottom perspective view of an aircraft, according to an exemplary embodiment of the present disclosure.

FIG. 2 is a diagrammatic representation of a bottom perspective view of the aircraft 102, according to an exemplary embodiment of the present disclosure. The aircraft 102 includes a propulsion system 212 that may include two turbofan engines 214, for example. Optionally, the propulsion system 212 may include more engines 214 than shown. The engines 214 are carried by wings 216 of the aircraft 102. In other embodiments, the engines 214 may be carried by the fuselage 104 and/or an empennage 220. The empennage 220 may also support horizontal stabilizers 222 and a vertical stabilizer 224. The fuselage 104 of the aircraft 102 defines an internal cabin, which may include a cockpit 230.

The aircraft 102 may be sized, shaped, and configured other than shown in FIG. 2. For example, the aircraft 102 may be a non-fixed wing aircraft, such as a helicopter. As another example, the aircraft 102 may be an unmanned aerial vehicle (UAV).

As shown, the aircraft 102 includes three landing gears 108, namely a nose landing gear 108a, a left main landing gear 108b, and a right main landing gear 108c. Optionally, the aircraft 102 may include more or less than three landing gears 108. Each landing gear 108a, 108b, and 108c includes a respective wheel assembly 230a, 230b, and 230c operatively coupled to a respective lever assembly 232a, 232b, and 232c, respectively.

The landing gears 108a, 108b, and 108c are shown in deployed positions in FIG. 2. The nose landing gear 108a is configured to move into and out of a nose landing gear well 106a. In order for the nose landing gear 108a to move into the deployed position, nose doors 110 are opened. The left main landing gear 108b is configured to move into and out of a left landing gear well 106b. In order for the left main landing gear 108b to move into the deployed position, a left door 110b is opened. The right main landing gear 108c is configured to move into and out of a right landing gear well 106c. In order for the right main landing gear 108c to move into the deployed position, a right door 110c is opened.

Sensors 112a, 112b, 112c are positioned on and/or proximate to the nose landing gear 106a, the doors 110a, the left main landing gear 108b, the door 110b, the right main landing gear 108c, and the door 110c to detect positions therefor. More or less sensors may be used. Further, the sensors 112a, 112b, and 112c may be at positions other than shown.

Referring to FIGS. 1 and 2, as described above, the landing gear timing analysis control unit 114 compares the times of motion for the landing gear 108a, 108b, 108c, and the door(s) 110a, 110b, and 110c with normal operating times stored in the timing database 118. In at least one embodiment, the normal landing gear deployment time includes a normal nose landing gear deployment operating time, a normal left main landing gear deployment operating time, and a normal right main landing gear deployment operating time. In at least one embodiment, the normal landing gear retraction operating time includes a normal nose landing gear retraction operating time, a normal left main landing gear retraction operating time, and a normal right main landing gear retraction operating time. In at least one embodiment, the normal door opening operating time includes a normal nose door opening operating time, a normal left door opening operating time, and a normal right door opening operating time. In at least one embodiment, the normal door closing operating time includes a normal nose door closing operating time, a normal left door closing operating time, and a normal right door closing operating time.

The following table lists examples of time ranges for various normal operating times:

| Normal Operating Time | Time Range |
| --- | --- |
| normal nose landing gear deployment operating time | 12-15 seconds |
| normal left main landing gear deployment operating time | 18-20 seconds |
| normal right main landing gear deployment operating time | 18-21 seconds |
| normal nose landing gear retraction operating time | 10-11 seconds |
| normal left main landing gear retraction operating time | 12-16 seconds |
| normal right main landing gear retraction operating time | 9-13 seconds |
| normal nose door opening operating time | 12-14 seconds |
| normal left door opening operating time | 18-21 seconds |
| normal right door opening operating time | 18-21 seconds |
| normal nose door closing operating time | 9-11 seconds |
| normal left door closing operating time | 13-16 seconds |
| normal right door closing operating time | 13-16 seconds |

Each of the normal operating times shown above may be empirically determined or otherwise defined as a range, and may be stored in the timing database 118, shown in FIG. 1. Optionally, the normal operating times may be specific time thresholds, instead of a range. It is to be understood that the normal operating times shown above are merely exemplary, and may differ for different aircraft and/or different types of aircraft. Further, different normal operating times for different portions of the landing gear and/or doors may be used. For example, motion of certain portions of levers, gears, pistons, and/or the like may be analyzed and compared to respective normal operating times, instead of (or in addition to) those shown above.

Figure 3:
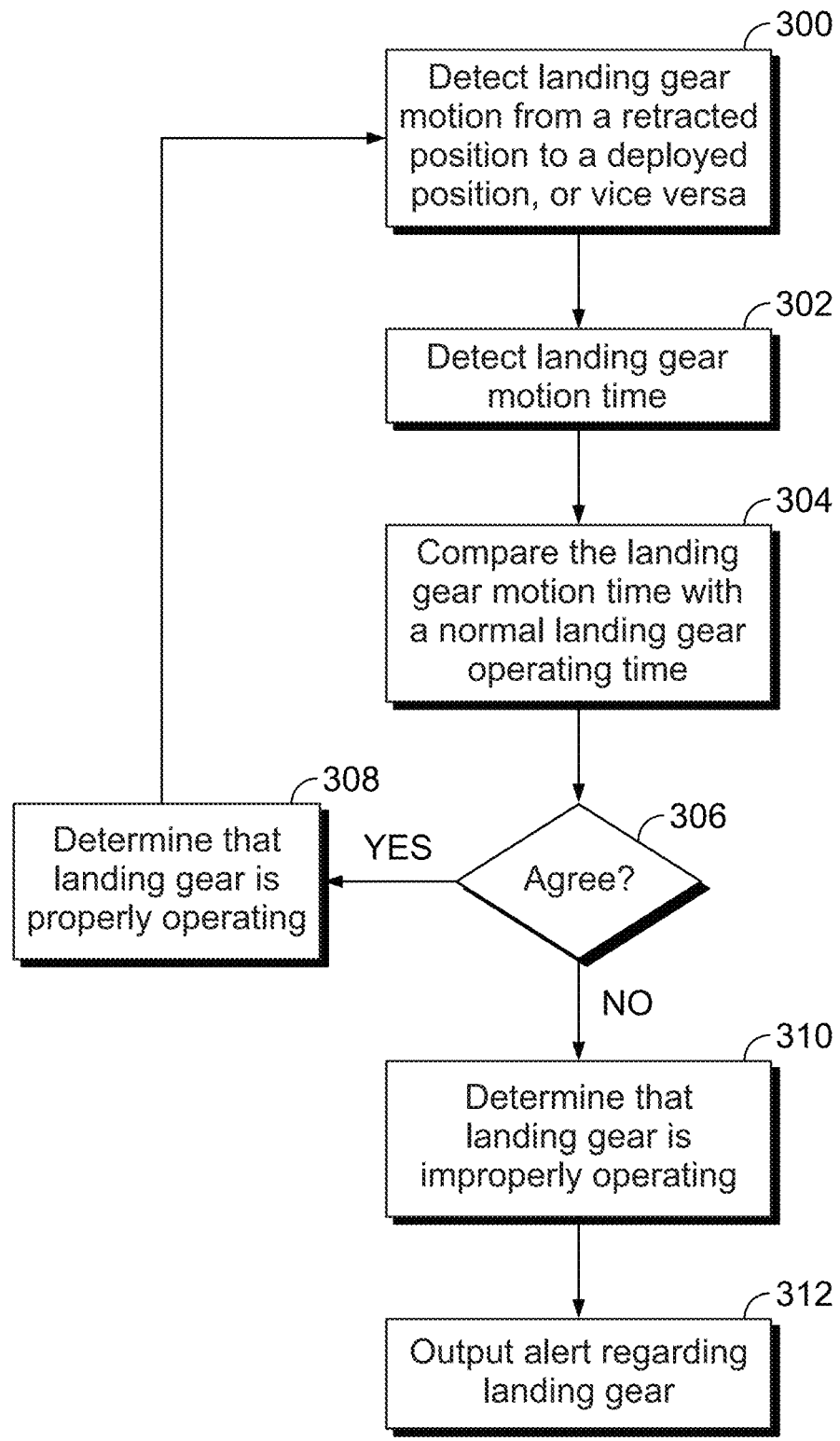
FIG. 3 illustrates a flow chart of a landing gear monitoring method for an aircraft, according to an embodiment of the present disclosure.

FIG. 3 illustrates a flow chart of a landing gear monitoring method for an aircraft, according to an embodiment of the present disclosure. Referring to FIGS. 1 and 3, at 300, the landing gear timing analysis control unit 114 detects landing gear motion from a retracted position to a deployed position, or vice versa, such as via the sensor(s) 112. At 302, the landing gear timing analysis control unit 114 detects a time of the landing gear motion (that is, landing gear motion time), such as via the timer 116.

At 304, the landing gear timing analysis control unit 114 compares the landing gear motion time with a normal landing gear operating time for the relevant landing gear motion. The normal landing gear operating time is stored in the timing database 118.

At 306, the landing gear timing analysis control unit 114 determines if the landing gear motion time agrees with the normal landing gear operating time. If there is agreement, the method proceeds from 306 to 308, at which the landing gear timing analysis control unit 114 determines that the landing gear 108 is properly operating, and then the method returns to 300.

If, however, there is not agreement at 306, the method proceeds from 306 to 310, at which the landing gear timing analysis control unit 114 determines that the landing gear 108 is improperly operating. The method then proceeds to 312, at which the landing gear timing analysis control unit 114 outputs an alert regarding the landing gear 108.

Figure 4:
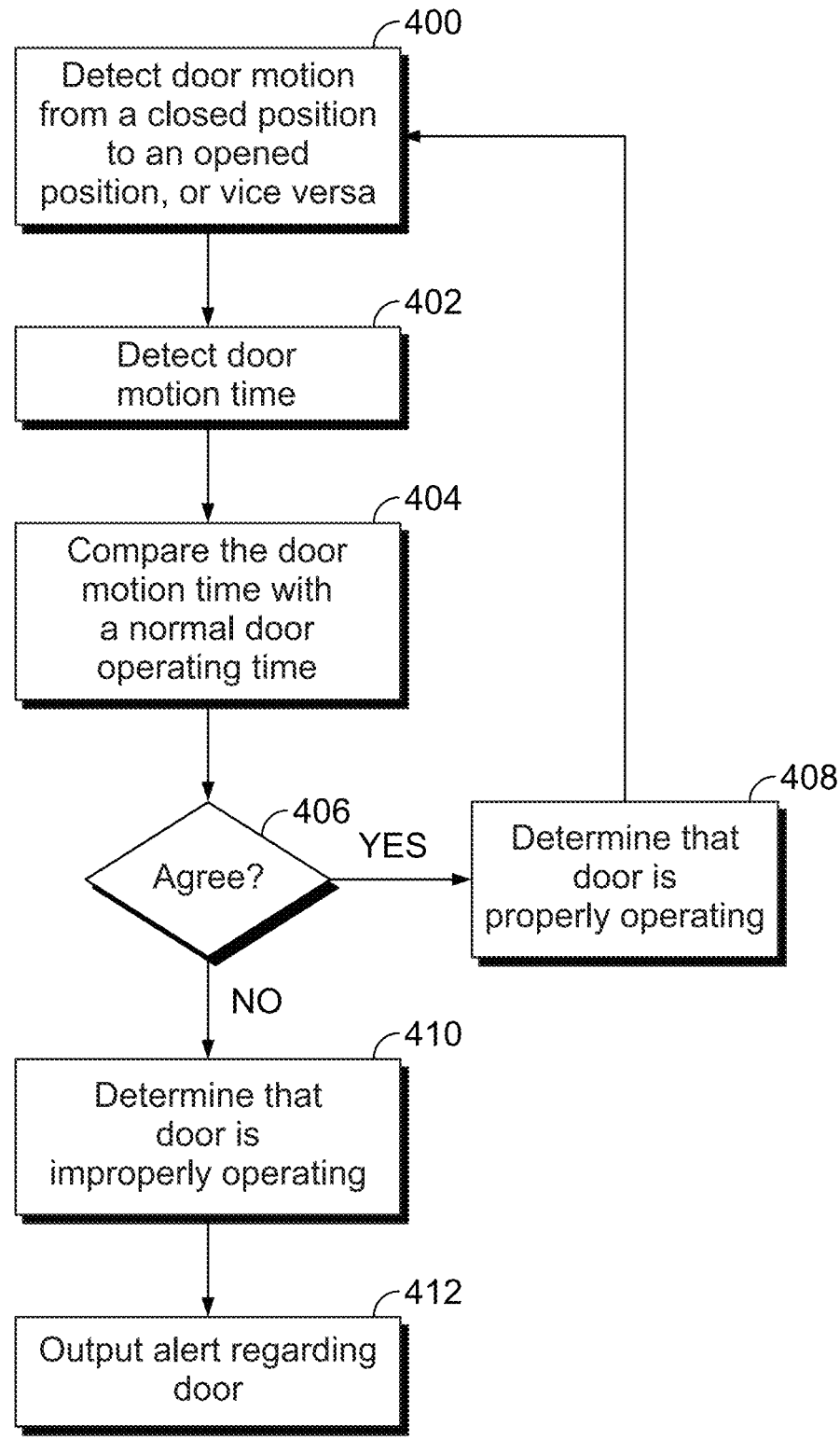
FIG. 4 illustrates a flow chart of a landing gear monitoring method for an aircraft, according to an embodiment of the present disclosure.

FIG. 4 illustrates a flow chart of a landing gear monitoring method for an aircraft, according to an embodiment of the present disclosure. Referring to FIGS. 1 and 4, at 400, the landing gear timing analysis control unit 114 detects door motion from a closed position to an open position, or vice versa, such as via the sensor(s) 112. At 402, the landing gear timing analysis control unit 114 detects a time of the door motion (that is, door motion time), such as via the timer 116.

At 404, the landing gear timing analysis control unit 114 compares the door motion time with a normal door operating time for the relevant door motion. The normal door operating time is stored in the timing database 118.

At 406, the landing gear timing analysis control unit 114 determines if the door motion time agrees with the normal door operating time. If there is agreement, the method proceeds from 406 to 408, at which the landing gear timing analysis control unit 114 determines that the door(s) 110 is properly operating, and then the method returns to 400.

If, however, there is not agreement at 406, the method proceeds from 406 to 410, at which the landing gear timing analysis control unit 114 determines that the door(s) 110 is improperly operating. The method then proceeds to 412, at which the landing gear timing analysis control unit 114 outputs an alert regarding the door(s) 110.

Referring to FIGS. 1, 3, and 4, in at least one embodiment, the landing gear timing analysis control unit 114 operates to determine operational status of the landing gear 108 and the door(s) 110 concurrently. That is, in at least one embodiment, the landing gear timing analysis control unit 114 operates according to both methods shown in FIGS. 3 and 4. In at least one other embodiment, the landing gear timing analysis control unit 114 may operate according to one of the methods shown in FIG. 3 or 4.

Additionally, in at least one embodiment, the landing gear timing analysis control unit 114 may store landing gear motion times and/or door motion times in the timing database 118 over time. The landing gear timing analysis control unit 114 may analyze landing gear motion time trends and/or door motion time trends over time to predict when the landing gear 108 and/or the door(s) 110 should be serviced or otherwise replaced in order to ensure proper effectiveness.

As described herein, embodiments of the present disclosure provide systems and methods for monitoring landing gear of an aircraft. Further, embodiments of the present disclosure provide systems and methods for accurately determining when landing gear of an aircraft is in need of attention (such as for service, maintenance, or replacement). Additionally, embodiments of the present disclosure provide systems and methods for assessing current and future effectiveness of landing gear of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A landing gear monitoring system for an aircraft, the landing gear monitoring system comprising:
 a landing gear timing analysis control unit that is configured to analyze one or both of landing gear motion of one or more landing gears of the aircraft or door motion of one or more doors proximate to the one or more landing gears to determine an operational status of one or both of the one or more landing gears or the one or more doors; and
 a timer in communication with the landing gear timing analysis control unit, wherein the landing gear timing analysis control unit is configured to detect, via the timer, one or both of a landing gear motion time of the landing gear motion between a retracted position and a deployed position or a door motion time of the door motion between a closed position and an open position.

2. The landing gear monitoring system of claim 1, wherein the one or more doors are configured to cover the one or more landing gears when the one or more landing gears are in a retracted position, and wherein the one or more doors are configured to open to allow the one or more landing gears to move into a deployed position.

3. The landing gear monitoring system of claim 1, wherein the one or more landing gears comprise a nose landing gear, a left main landing gear, and a right main landing gear.

4. The landing gear monitoring system of claim 1, further comprising one or more sensors in communication with the landing gear timing analysis control unit, wherein the one or more sensors are configured to detect one or both of the landing gear motion or the door motion.

5. The landing gear monitoring system of claim 1, wherein the landing gear timing analysis control unit is configured to analyze the landing gear motion between a retracted position and a deployed position in relation to at least one normal landing gear operating time for the one or more landing gears to determine the operational status of the one or more landing gears.

6. The landing gear monitoring system of claim 5, further comprising a timing database in communication with the landing gear timing analysis control unit, wherein the at least one normal landing gear operating time is stored in the timing database.

7. The landing gear monitoring system of claim 6, wherein the at least one normal landing gear operating time comprises one or both of a normal landing gear deployment operating time and a normal landing gear retraction operating time.

8. The landing gear monitoring system of claim 1, wherein the landing gear timing analysis control unit is configured to analyze the door motion between a closed position and an open position in relation to at least one normal door operating time for the one or more doors to determine the operational status of the one or more doors.

9. The landing gear monitoring system of claim 8, further comprising a timing database in communication with the landing gear timing analysis control unit, wherein the at least one normal door operating time is stored in the timing database.

10. The landing gear monitoring system of claim 8, wherein the at least one normal door operating time comprises one or both of a normal door opening operating time and a normal door closing operating time.

11. The landing gear monitoring system of claim 1, wherein the landing gear timing analysis control unit is configured to analyze one or both of the landing gear motion or the door motion and predict a time of effectiveness of one or both of the one or more landing gears or the one or more doors.

12. The landing gear monitoring system of claim 11, wherein the landing gear timing analysis control unit is configured to predict the time of effectiveness of one or both of the one or more landing gears or the one or more doors based on timing trends over a predetermined time period, and wherein the landing gear timing analysis control unit is configured to predict when one or both of the one or more landing gears or the one or more doors are to be replaced.

13. A landing gear monitoring method for an aircraft, the landing gear monitoring method comprising:
communicatively coupling a timer with a landing gear timing analysis control unit;
detecting, by the landing time gear timing analysis control unit via the timer, one or more of a landing gear motion time of landing gear motion of landing gear between a retracted position and a deployed position or a door motion time of door motion of one or more doors proximate to the one or more landing gears between a closed position and an open position;
analyzing, by the landing gear timing analysis control unit, one or both of the landing gear motion of the one or more landing gears of the aircraft or the door motion of the one or more doors proximate to the one or more landing gears;
determining through the analyzing, by the landing gear timing analysis control unit, an operational status of one or both of the one or more landing gears or the one or more doors.

14. The landing gear monitoring method of claim 13, further comprising:
communicatively coupling one or more sensors with the landing gear timing analysis control unit; and
detecting, by the one or more sensors, one or both of the landing gear motion or the door motion.

15. The landing gear monitoring method of claim 13, wherein the analyzing comprises analyzing the landing gear motion between a retracted position and a deployed position in relation to at least one normal landing gear operating time for the one or more landing gears.

16. The landing gear monitoring method of claim 13, wherein the analyzing comprises analyzing the door motion between a closed position and an open position in relation to at least one normal door operating time for the one or more doors.

17. The landing gear monitoring method of claim 13, further comprising predicting, by the landing gear timing analysis control unit, a time of effectiveness of one or both of the one or more landing gears or the one or more doors.

18. The landing gear monitoring method of claim 17, wherein the predicting comprises:
predicting, by the landing gear timing analysis control unit, the time of effectiveness of one or both of the one or more landing gears or the one or more doors based on timing trends over a predetermined time period; and
predicting, by the landing gear time analysis control unit, when one or both of the one or more landing gears or the one or more doors are to be replaced.

19. A landing gear monitoring system for an aircraft, the landing gear monitoring system comprising:
a landing gear timing analysis control unit that is configured to analyze landing gear motion of landing gears of the aircraft and door motion of doors proximate to the landing gears to determine an operational status of the landing gears and the doors, wherein the doors are configured to cover the landing gears when the landing gears are in a retracted position, and wherein the doors are configured to open to allow the landing gears to move into a deployed position;
sensors in communication with the landing gear timing analysis control unit, wherein each of the sensors is configured to detect one or both of the landing gear motion or the door motion;
a timer in communication with the landing gear timing analysis control unit, wherein the landing gear timing analysis control unit is configured to detect, via the timer, landing gear motion times of the landing gear motion between a retracted position and a deployed position and door motion times of the door motion between a closed position and an open position, wherein the landing gear timing analysis control unit is configured to analyze the landing gear motion between the retracted position and the deployed position in relation to normal landing gear operating times for the landing gears to determine the operational status of the landing gears, and wherein the landing gear timing analysis control unit is configured to analyze the door motion between a closed position and an open position in relation to normal door operating times for the doors to determine the operational status of the doors; and a timing database in communication with the landing gear timing analysis control unit, wherein the normal landing gear operating times and the normal door operating times are stored in the timing database.

20. The landing gear monitoring system of claim 19, wherein the landing gear timing analysis control unit is further configured to analyze the landing gear motion and the door motion and predict a time of effectiveness of the landing gears and the doors.

\* \* \* \* \*